United States Patent [19]

Sireix

[11] Patent Number: 4,693,149

[45] Date of Patent: Sep. 15, 1987

[54] DEVICE FOR THE AUTOMATIC CUTTING OF CARDBOARD AND OTHER TUBES

[76] Inventor: Georges Sireix, 9, rue Saint-Marc, 68400 Riedisheim, France

[21] Appl. No.: 740,958

[22] Filed: Jun. 4, 1985

[30] Foreign Application Priority Data

Jun. 8, 1984 [FR] France .............................. 84 09176

[51] Int. Cl.$^4$ .............................................. B23B 5/14

[52] U.S. Cl. ...................................... 82/53.1; 82/50; 82/100; 82/101; 72/50

[58] Field of Search .................. 82/53.1, 50, 100, 101; 72/49, 50

[56] References Cited

U.S. PATENT DOCUMENTS

| | | | |
|---|---|---|---|
| 1,990,696 | 2/1935 | Johnson | 82/100 |
| 2,186,583 | 1/1940 | Groh | 82/50 |
| 3,933,063 | 1/1976 | Stoffels | 82/101 |
| 3,985,051 | 10/1976 | Brown | 82/101 |
| 4,299,147 | 11/1981 | Rogers | 82/53.1 |

*Primary Examiner*—Nicholas P. Godici
*Assistant Examiner*—Jerry Kearns
*Attorney, Agent, or Firm*—Robert E. Burns; Emmanuel J. Lobato

[57] ABSTRACT

The invention concerns a device for the automatic cutting of circular tubes of small, medium and large thickness, obtained by gluing together several strips of fibrous, cellulose, metallic, or plastic materials, and generally speaking any materials in strips, and made by using a spiralizer, a profiler or an extruder.

This device for automatic cutting is characterized by the fact that it comprises a fixed mandrel (2) on which the circular tube (4) coming from the spiralizer, profiler or extruder turns freely and is driven without constraint either side of the cutting line by counter-rollers (8, 9) subject to a rotary movement synchronized with the speed of rotation of the circular tube (4), this fixed mandrel (2) cooperating for the cut with at least one cutting group provided with a knife milled with two bevelled edges which are very sharp (43) which is immobile in rotation at the moment of cutting.

The invention concerns disposable packs.

8 Claims, 5 Drawing Figures

DEVICE FOR THE AUTOMATIC CUTTING OF CARDBOARD AND OTHER TUBES

Figure 1:
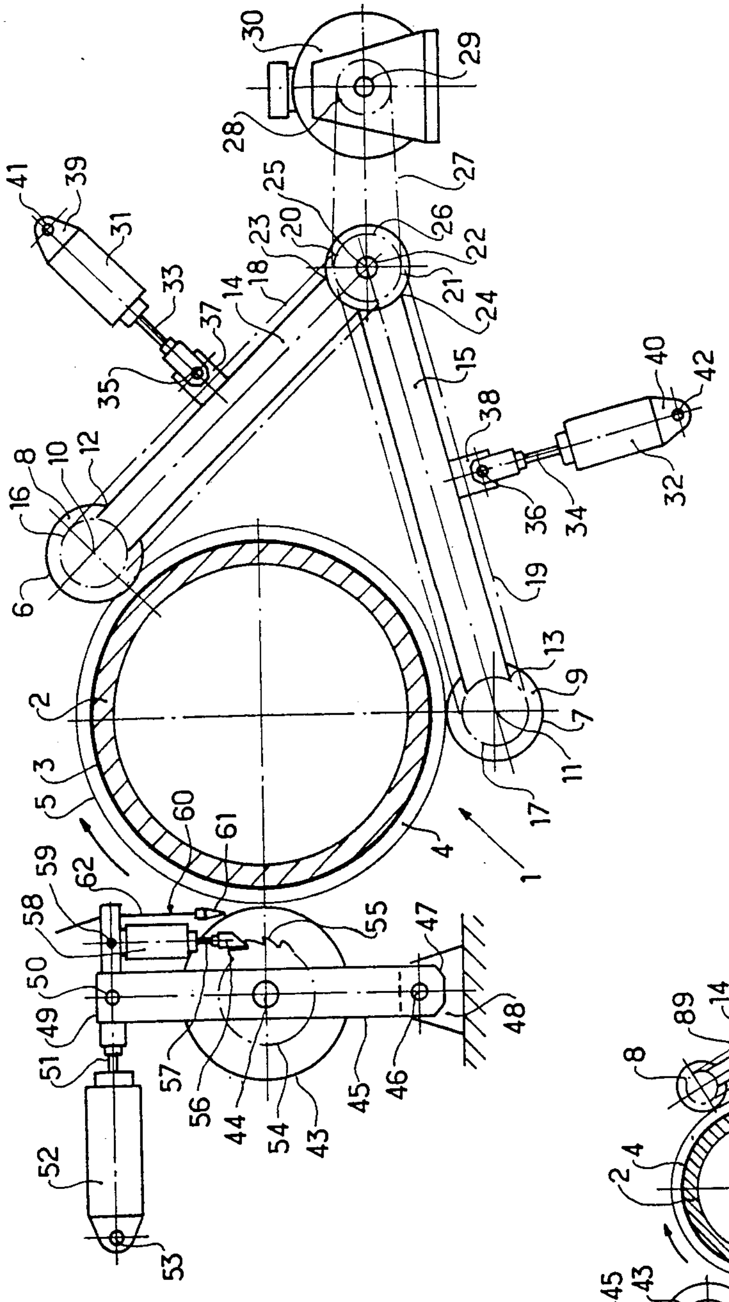

The invention concerns a device for the automatic cutting of circular tubes of small, medium and large thickness obtained by the gluing several strips of of fibrous, cellulose, metallic and plastic materials and, generally speaking, all materials in strips, and made using a spiralizer, a profiler or an extruder.

We already know, from French Pat. No. 2,370,581, a device for the power-driven sawing of tubular elements composed of cardboard or similar materials, installed on a machine for the manufacture of tubular packs constituted of strips glued together on top of one another according to a determined pitch, these strips being of fibrous, cellulose, metallic or other materials. This power-driven sawing device, which permits cutting in flight, comprises a chariot gliding along a rail maintained by supports. On this chariot, an electric motor is mounted, whose shaft is fitted with a saw blade with teeth. This cooperates with a counter-roller for cutting which is in one piece with the chariot. The latter is in one piece with a translation device which advances the chariot. A certain space is provided between the saw blade and the counter-roller to permit the passage of the tubular element. During cutting, the saw blade is made to advance, continuously rotating through the electric motor, towards the counter-roller.

We also know, from French Pat. No. 2,370,582, machines for making packs such as described above. These machines comprise two mobile drums in rotation, connected to one another by a belt which describes a helicoidal movement which causes, on the one hand, a helicoidal winding of the different strips of paper, metal or other materials, coated beforehand with glue and, on the other hand, a continuous advance of the tubular element on a broach. Across this broach slides a shaft acting on a multiple cutting device subject to displacement along the axis of advance of the tubular element, the speeds of advance and multiple cutting are synchronized with the speed of advance of the tubular element. This device comprises a number of saw blades corresponding to the number of cuts it is desired to make. These cutting elements are subject to a triple displacement in space, i.e. a rotation around their axis, a pendular movement for sawing the tubular element, and a longitudinal displacement in the direction of the advance of the tubular element.

We also know cutting devices comprising fixed knives and modules driven by the inside of the tube by means of an extensible clamp.

These known devices, however, have several disadvantages. Because of the rotation imposed on the saw blades, these heat up rapidly and their cutting edges are blunted. This gives rise to defective cuts because the tubular element is crushed between the internal cutting mandrels and the knife blades which turn in a fixed position or are displaced in the direction of advance of the tubular element. Even if the knife blades are perfectly sharpened, a crushing takes place which spoils not only the look but also the precision of the cut. Moreover there is a risk that, at the end of the cut, the remaining material to be cut is not sufficiently resistant to transmit the rotation of the tube above the cutting line of the section to be cut. The result is that, at the end of the cut, this piece is torn off, and this spoils the finish of the cut.

We also know a cutting device using a knife turning at a speed between two thousand and five thousand rpm. The blade, being of treated steel or tungsten carbide steel, has straight or conical teeth. The disadvantages of this cutting device lie in the fact that it generates dust, makes a great deal of noise, is extremely dangerous, and needs this knife blade very frequently sharpened.

The object of this invention is to overcome these disadvantages, and it aims at providing an automatic cutting device for circular tubes, which can be used, on the one hand, on spiralizers making tubes in cardboard or composite materials, in thicknesses varying from 0.2 to 30 mm and, on the other hand, cutting tubes in cardboard, plastic or all materials which are suitable after manufacture for cutting up into single or multiple precision elements.

For this purpose, the device has means for the automatic cutting of circular tubes of small, medium and great thickness, obtained by gluing together several strips in fibrous, cellulose, metallic or plastic materials and, generally speaking, any material in strips, and made with a spiralizer, a profiler or an extruder, characterized by the fact that it comprises a fixed mandrel on which the circular tube coming from the spiralizer, profiler or extruder turns freely, and is driven without constraint on either side of the cutting line by counter-rollers which are subject to a rotary movement synchronized with the speed of rotation of the circular tube, this fixed mandrel cooperating for the cut with at least one cutting group provided with a blade milled with a double cutting edge, which is immobile in rotation at the moment of cutting.

The advantages obtained with this invention consist essentially in the fact that the cuts are perfectly smooth and of the waxed type, having the aspect of a coat of varnish, and without crushing the circular tube. In addition, this cutting device is extremely simple and can be used on existing machines or machines to be designed in the future, and in particular on all machines producing tubes compatible with this cutting device of a thickness of 0.2 to 30 mm, made either by gluing together strips in several layers, or by extrusion, or by laminating several layers.

According to another feature of the invention, each cutting group comprises means for blocking the cutting blade during the cutting, but conferring on this cutting blade a fragmented rotation between two consecutive cuts.

This means that the heating up of the cutting element is avoided, while permitting self-cleaning and self-sharpening of the cutting element.

Figure 2:
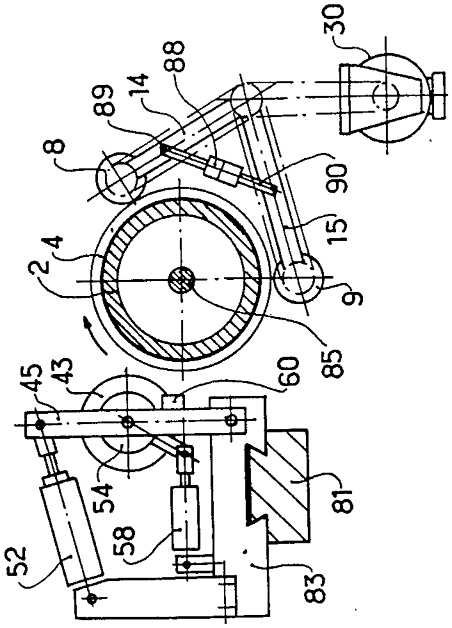
Figure 3:
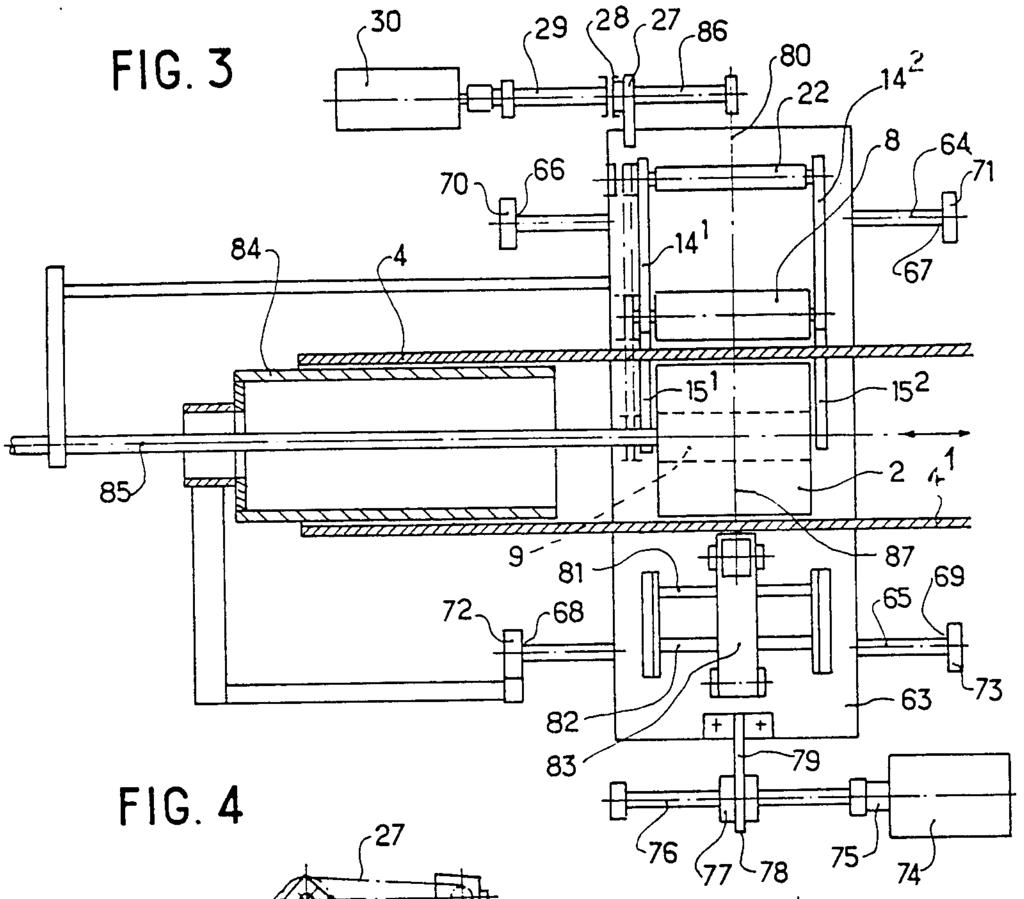
Figure 4:
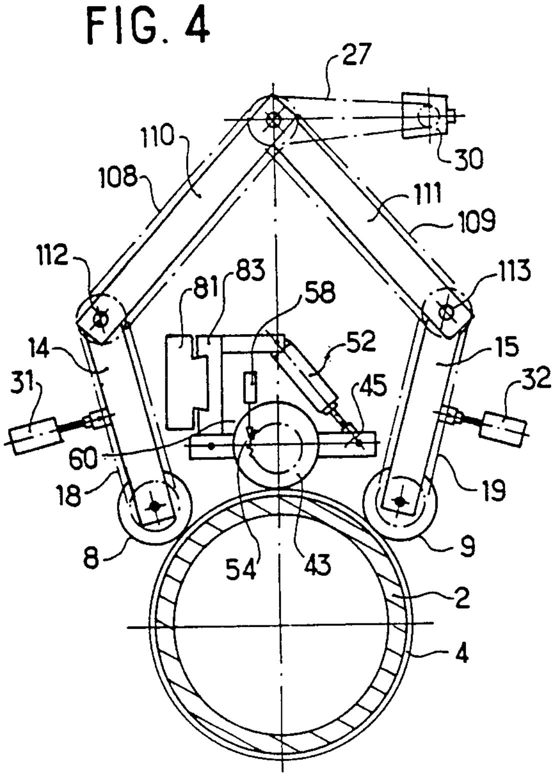
Figure 5:
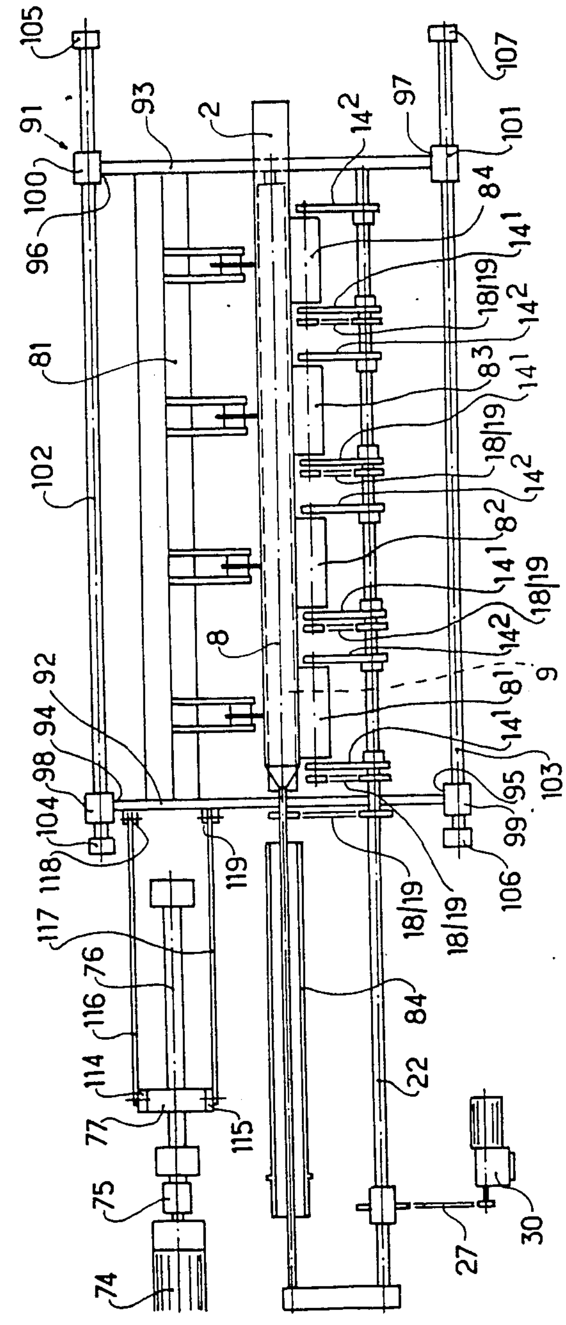

The invention will be clearly understood by referring to the following description which is given as a non-limitative example, and to the attached drawings in which:

FIG. 1 is a view in elevation of the cutting device in conformity with the invention FIG. 2 is a view in elevation of the cutting device permitting a unitary cut in flight for a small or large thickness spiralizer FIG. 3 is a horizontal section of this cutting device FIG. 4 is a view in elevation of the cutting device according to a different model FIG. 5 is a plan view of the cutting device permitting multiple cuts.

As shown in FIG. 1, the cutting device 1 comprises a fixed cylindrical mandrel 2 made of a material that is resistant to wear but has a low coefficient of friction. On the outside circumference 3 of this mandrel a freshly formed circular tube 4 coming from a spiralizer, a profiler or an extruder turns freely. This circular tube 4 is obtained by gluing together several strips of fibrous, cellulose, metallic or plastic material and, generally speaking, any material in strips. Because of the fact that this mandrel 2 has a very low coefficient of friction, the circular tube 4 turns easily on this mandrel 2.

On the outside circumference 5 of the circular tube 4, there rest the circumferences 6, 7 of at least two counter-rollers 8, 9. The counter-rollers 8, 9 have a breadth such that their extremitites are situated on either side of the cutting line. Thus, at the end of the travel, the drive is exercised both on the circular tube 4 and on the section situated beyond the cutting line, which avoids any risk of this section being torn off at the end of the cut. Because the circular tube 4 is fragile, since it has just been glued or extruded, it is necessary for the counter-rollers 8, 9 to exercise no stress on the circular tube 4 so as to avoid any crushing of the tube. These two counter-rollers 8, 9, comprising a metal core provided with an adhesive coating are subjected to a rotating movement the speed of which is synchronized with the speed of rotation of the circular tube 4. The two counter-rollers 8, 9 rotate in one piece with a shaft 10,11 fitted at the extremities 12, 13 with two pairs of levers 14, 15. On the shaft 10 is mounted, rotating in one piece with it, the driven element 16,17 of a transmission 18, 19. The latter is driven by a motor element 20, 21. These two motor elements 20, 21 rotate in one piece with an intemediary shaft 22, fitted at the other extremity 23, 24 with the pairs of levers 14, 15. This intermediary shaft 22 also serves as the axis of rotation for the pairs of levers 14, 15. On this intermediary shaft 22 is fixed, rotating in one piece with it, a driven element 26 of a central transmission 27 whose motor element 28 rotates in one piece with the shaft 29 of a motor reducer-variator 30.

To urge the counter-rollers 8, 9 against the outside circumference 5 of the circular tube 4 or, conversely to break contact between the two counter-rollers 8, 9 and the outside circumference 5 of the circular tube 4, for each lever a jack 31, 32 is provided. The pistons, 33, 34 of these jacks 31, 32 are connected on an articulation axis 35, 36 to a cover 37, 38 in one piece with each of the levers 14, 15, while the extremity 39, 40 of the jacks 31, 32 is connected on an articulation axis 41, 42 to the frame (not represented) of the cutting device.

When the two counter-rollers 8, 9 are applied against the outside circumference 5 of the circular tube 4, a drive is obtained by the friction of the latter by the intermediary of the two counter-rollers 8, 9 which are driven and synchronized.

For sectioning the circular tube 4, a cutting group is provided consisting essentially of a knife 43 milled with a double cutting edge which is very sharp. This knife 43 can pivot around an axis 46 situated at one of the extremities 47 of the levers 45, this axis 46 being maintained by bearings in one piece with the frame. The outer extremity 49 of the levers 45 is connected on an axis 50 to a piston 51 of a jack 52. This jack 52, connected on an axis 53 to the frame, causes a tilting of the levers 45 around the axis 46. The speed of travel of the piston 51 of the jack 52 is adjustable as a function of the speed of rotation of the circular tube 2. During this tilting, the knife 43 penetrates the circular tube 4. In conformity with the invention, the cutting knife 43 is blocked in rotation while in the cutting range or phase. For this purpose, the cutting knife 43 has a ratched wheel 54 rotating in one piece with this cutting knife 43. The teeth 55 of this ratchet wheel 54 cooperate with a pawl in one piece with a piston 57 of a jack 58 which along an articulation axis 59 joins in one piece with the piston 51 of the jack 52. When the knife 53 is in cutting range, the pawl 56 blocks the rotation of the ratchet wheel 54 and in consequence, blocks the rotation of the cutting knife 43. After completion of the cutting and retracting movement of the knife 43 out of the cutting range and into a non-cutting range, the jack 58 is activated. The pawl 56 provokes a partial rotation of the cutting knife 43. Thus the knife is subjected to intermittent stepwise rotation. In this way, heating-up of the cutting element 43 is avoided, and it is possible to provide means for the self-cleaning and self-sharpening of this cutting knife 43. Means 60 for greasing are also provided consisting of a grease nozzle 61 at the extremity of a greasing circuit 62.

When the cutting knife 43 reaches the mandrel 2, the circular tube 4 is cut cleanly and without burrs, since the two parts of the circular tube 4 situated on either side of the cutting line are still driven by the counter-rollers 8, 9, without slipping in relation to one another.

We refer to FIGS. 2 and 3 representing another way of making the cutting device 1, subjected to displacement in the direction of advance of the circular tube 4. For this purpose, a circular table 63 is provided gliding on rollers 64, 65, whose extremities 66, 67, 68, 69 are maintained by supports 70, 71, 72, 73 in one piece with the frame. The displacement of the table 63 is ensured by a motor reducer-variator 74 of which the shaft 75 is provided with a screw 76 on which a nut 77 is displaced, mounted on the extremity 78 of a support 79 which is in one piece with the table 63. In relation to the median plane 80 of the table 63, means are also provided permitting the whole of the cut to be displaced in relation to the table 63. These consist of one or two adjustable girders 81, 82 on which a knife-holder 83 slides. The advance of the cutting knife 43 with its ratchet wheel 54 in the direction of the mandrel 2, the jack 58 with its pawl 56 and the means for greasing 60.

As the circular tube 4 may present a certain length, a shaping mandrel 84 is provided, which is also in one piece with the frame. Through this shaping mandrel 84 passes a mechanical connection 85 to maintain the mandrel 2 immobile.

In consequence of the displacement of the table 63, it is necessary to provide means for ensuring the drive of the counter-rollers 8, 9 maintained by the levers $\mathbf{14}_1$, $\mathbf{14}_2$, $\mathbf{15}_1$, $\mathbf{15}_2$. The shaft 29 of the motor reducer-variator 30 is coupled to a secondary shaft 86. This secondary shaft 86 drives in rotation the motor element 28 of the central transmission 27 while permitting this motor element 28 to slide on the secondary shaft 86.

To avoid slipping of the section 4, in relation to the circular tube 4 which would cause material to be torn off, the counter-rollers 8, 9 are given a certain length so that they ensure a constant drive on either side of the cutting line 87 both of the circular tube 4 and the section $\mathbf{4}_1$ until the cut has been made completely. As can be seen from FIG. 2, the jacks 31, 32 have been replaced by a single jack 88 for activating in the opposite direction the pistons 89, 90 which permits synchronized movements to be conferred on the levers $\mathbf{14}_1$, $\mathbf{14}_2$, $\mathbf{15}_1$, $\mathbf{15}_2$ for bringing the counter-rollers 8, 9 nearer to or further from the circular tube 4.

With reference to FIGS. 4 and 5, the cutting device in conformity with the invention can be mounted on machines intended for cutting or cutting up circular tubes 4 either in single or multiple cuts. For this purpose a mobile chariot 91 is provided composed of two supports 92, 93 disposed perpendicularly to the fixed mandrel 2. The extremities 94, 95, 96, 97 of these supports 92, 93 are provided with ball bearings 98, 99, 100, 101 running on slides 102, 103 maintained by the supports 104, 105, 106, 107 in one piece with the frame. Between the two supports 92, 93 is the adjustable girder 81 comprising a number of knife-holders 83 each provided with levers 45 and the jack 52 provoking the advance of the cutting knife 43 with its ratchet wheel 53 in the direction of the mandrel 2 and the jack 58 with its pawl 56 and the means for greasing 60.

According to a first mode of constructing the invention, between the two supports 92, 93 are disposed the counter-rollers 8, 9, extending from one support 92 to the other 93 and driven over the whole of their length. These counter-rollers 8, 9, maintained by the levers 14, 15 are driven by the motor reducer-variator 30 via the central transmission 27, the intermediary shaft 22 and the transmissions 18,19.

According to a second mode of construction, between the two supports 92, 93 are disposed individual counter-rollers $8_1$, $8_2$, $8_3$, $8_4$ driven by cutting units. For each individual counterroller $8_1$, $8_2$, $8_3$, $8_4$, we provide levers $14_1$, $14_2$ and $15_1$, $15_2$ and the transmissions 18, 19 driven by the intermediate shaft 22.

If necessary, we can insert between the intermediary shaft 22 and the transmissions 18, 19 secondary transmissions 108, 109 transmitting the drive from the intermediary shaft to the counter-rollers 8, 9 via the secondary transmissions 108, 109 and the transmissions 18, 19. The secondary transmissions 108, 109 are maintained by fixed traverses 110, 111. The connection 112, 113 between the latter and the levers 14, 15 serves as an axis of rotation for the latter.

The displacement of the mobile chariot 91 is ensured by the motor reducer-variator 74 whose shaft 75 is provided with the screw 76 on which moves the nut 77 in one piece with one of the extremities 114, 115 of the two axes 116, 117, of which the other extremity 118, 119 is in one piece with the mobile chariot 91.

I claim:

1. A device for automatically cutting freshly formed circular tubes comprising: a fixed cylindrical mandrel for freely turnably supporting thereon a freshly formed circular tube which is to be cut; means for supporting said mandrel, drive means for rotationally driving the circular tube so that it rotates around the fixed mandrel, the drive means comprising two rotatable counter-rollers disposed in angularly spaced relation about the fixed mandrel and extending lengthwise of the fixed mandrel, means for urging the counter-rollers against the circular tube, and means for rotationally driving the counter-rollers while the same are urged against the circular tube to thereby effect rotation of the circular tube around the fixed mandrel and cutting means for cutting the circular tube while the same is rotating, the cutting means comprising a rotatable circular knife having a peripheral cutting edge, and means for movably supporting said knife for moving said knife through a cutting range in which the knife cutting edge coacts with the fixed mandrel to effect cutting of the circular tube along a cut line and a non-cutting range in which the knife cutting edge is spaced from the fixed mandrel, means for restraining the knife from rotating while in said cutting range, said restraining means comprising a rachet wheel connected to the knife for movement therewith, and a pawl engageable with the ratchet wheel to hold the ratchet wheel and hence the knife against rotation, and means for actuating said pawl to effect incremental angular displacement of said ratchet wheel and knife while the knife is in the non-cutting range.

2. A device according to claim 1; in which said means supporting said knife comprises means for mounting the knife and ratchet wheel for rotational movement on a pivotable lever, and means for pivotting the lever to effect movement to the knife through the cutting and non-cutting ranges.

3. A device according to claim 1; wherein the means for moving the knife through a cutting range includes means for moving the knife at an ajustably settable speed.

4. A device for automatically cutting freshly formed circular tubes comprising; a fixed cylindrical mandrel for freely turnably supporting thereon a freshly formed circular tube which is to be cut, means for supporting said mandrel, drive means for rotationally driving the circular tube so that it rotates around the fixed mandrel, said drive means comprising two rotatable counter-rollers disposed in angular spaced relation about said fixed mandrel and extending lengthwise of said fixed mandrel, means for urging said counter-rollers against the circular tube, and means for rotationally driving the counter-rollers while the same are urged against the circular tube to thereby effect rotation of the circular tube around said fixed mandrel, and cutting means for cutting the circular tube while the same is rotating, said cutting means comprising a knife having cutting edge, a mobile knife holder supporting the knife thereon, means for moving the knife through a cutting range in which the knife cutting edge coacts with the fixed mandrel to effect cutting of the circular tube along a cut line and a non-cutting range in which the knife cutting edge is spaced from the fixed mandrel, and means for displacing the mobile knife holder lengthwise along the fixed mandrel to enable adjustment of the cutting position of the knife to vary the length a section cut from said tube, said means for displacing the mobile knife holder comprising a threaded nut fixedly secured to the knife holder, a rotatable screw threadedly engaged with the nut, and means for rotationally driving the screw to effect axial displacement of the nut along the screw accompanied by displacement of the knife holder.

5. A device for automatically cutting freshly formed circular tubes comprising a fixed cylindrical mandrel for freely turnably supporting thereon a freshly formed circular tube which is to be cut, means for supporting said mandrel, drive means for rotationally driving the circular tube so that it rotates around the fixed mandrel, said drive means comprising two rotatable counterrollers disposed in angular spaced relation about said fixed mandrel and extending lengthwise of said fixed mandrel, means for urging said counter-rollers against the circular tube, and means for rotationally driving the counter-rollers while the same are urged against the circular tube to thereby effect rotation of the circular tube around said fixed mandrel, and cutting means for cutting the circular tube while the same is rotating, the cutting means comprising a knife having a cutting edge, means for moving the knife through a cutting range in which the knife cutting edge coacts with the fixed mandrel to effect cutting of the circular tube along a cut line and a non-cutting range in which the knife-cutting edge is spaced from the fixed mandrel, each of said counter-rollers comprising a metallic core covered with an adhesive coating.

6. A device for automatically cutting freshly formed circular tubes comprising; a fixed cylindrical mandrel for freely turnably supporting thereon a freshly formed circular tube which is to be cut, means for supporting said mandrel, drive means for rotationally driving the circular tube so that it rotates around the fixed mandrel, said drive means comprising two rotatable counter-rollers disposed in angular spaced relation about said fixed mandrel and extending lengthwise of said fixed mandrel, means for urging said counter-rollers against the circular tube, and means for rotationally driving the counter-rollers while the same are urged against the circular tube to thereby effect rotation of the circular tube around said fixed mandrel, and cutting means for cutting the circular tube while the same is rotating, the cutting means comprising a knife having a cutting edge, means for moving the knife through a cutting range in which the knife cutting edge coacts with the fixed mandrel to effect cutting of the circular tube along a cut line and a non-cutting range in which the knife-cutting edge is spaced from the fixed mandrel, said means for urging each of the counterrollers against the circular tube comprising a pair of spaced levers having the counter-roller rotatably mounted therebetween at one end thereof, means pivotably mounting the other end of the pair of levers, and means connected to the pair of levers intermediate the ends thereof for pivotally moving the pair of levers to effect movement of the counter-rollers toward any away from the circular tube.

7. A device according to claim 6; wherein each counter-roller has a lengthwise extent sufficient to ensure that the same presses against the circular tube on both sides of the cut line during the cutting operation.

8. A device according to claim 6; wherein the means for rotationally driving the counter-rollers comprises a rotationally driven shaft, and transmission means extending along the lengths of the pairs of levers for transmitting the rotary motion of the driven shaft to the counter-rollers.

* * * * *